US008857652B2

(12) United States Patent
Lewis et al.

(10) Patent No.: US 8,857,652 B2
(45) Date of Patent: Oct. 14, 2014

(54) COOKING SUPPORT WITH REMOVABLE MESH INSERT

(71) Applicants: William James Lewis, Woodstock, IL (US); Marc W. F. Lewis, McHenry, IL (US); Malcolm M. Swift, Lake In The Hills, IL (US); Lambert Allen Terpstra, Crystal Lake, IL (US); William Christopher Lewis, St. Charles, IL (US)

(72) Inventors: William James Lewis, Woodstock, IL (US); Marc W. F. Lewis, McHenry, IL (US); Malcolm M. Swift, Lake In The Hills, IL (US); Lambert Allen Terpstra, Crystal Lake, IL (US); William Christopher Lewis, St. Charles, IL (US)

(73) Assignee: Advanced Flexible Composites, Inc., Lake In The Hills, IL (US)

( * ) Notice: Subject to any disclaimer, the term of this patent is extended or adjusted under 35 U.S.C. 154(b) by 0 days.

(21) Appl. No.: 13/865,337

(22) Filed: Apr. 18, 2013

(65) Prior Publication Data

US 2013/0277374 A1 Oct. 24, 2013

Related U.S. Application Data

(60) Provisional application No. 61/625,997, filed on Apr. 18, 2012.

(51) Int. Cl.
*A47J 36/22* (2006.01)
*A47J 36/16* (2006.01)
(52) U.S. Cl.
CPC . *A47J 36/16* (2013.01); *A47J 36/22* (2013.01)
USPC ...................................................... 220/573.4
(58) Field of Classification Search
CPC ........... A47J 27/10; A47J 36/20; A47J 36/16; A47J 43/22
USPC ............ 220/573.4, 573.1, 912, 574.3, 23.89, 220/23.87, 23.83, 23.9; 99/422
See application file for complete search history.

(56) References Cited

U.S. PATENT DOCUMENTS

| | | | | |
|---|---|---|---|---|
| 1,752,047 | A | * | 3/1930 | Wirt ................................. 241/95 |
| 2,807,454 | A | * | 9/1957 | Beadle ........................... 432/261 |
| 4,360,124 | A | | 11/1982 | Knaus et al. |
| 4,877,932 | A | | 10/1989 | Bernstein et al. |
| 4,933,193 | A | | 6/1990 | Fisher |
| 5,004,121 | A | | 4/1991 | Howe |
| 5,094,706 | A | | 3/1992 | Howe |

(Continued)

FOREIGN PATENT DOCUMENTS

| | | |
|---|---|---|
| EP | 0 235 037 A2 | 9/1987 |
| GB | 594075 | 11/1947 |

(Continued)

*Primary Examiner* — Robert J Hicks
(74) *Attorney, Agent, or Firm* — Pauley Petersen & Erickson

(57) ABSTRACT

A food support for holding food items during cooking in an oven. The food support includes a reinforcement structure including a perimeter frame extending around and defining a substrate placement area. At least one cross bar extends between two opposing portions of the support frame and beneath the substrate placement area. A removable and replaceable substrate insert is sized to be placed on the substrate placement area for receiving food items thereon. A securing element can be connected to the reinforcement structure for securing the substrate insert on the substrate placement area. A holding device including a holding surface connected to a clamping element, where the holding surface is adapted to support a bottom of the food support and the clamping element is adapted to clamp over a top surface of the food support, can be used to securely introduce and/or remove the food support from an oven.

20 Claims, 14 Drawing Sheets

(56) References Cited

U.S. PATENT DOCUMENTS

| | | |
|---|---|---|
| 5,322,182 A | 6/1994 | Fritz |
| 5,385,765 A | 1/1995 | Springer et al. |
| 5,970,856 A | 10/1999 | Fabrikant et al. |
| 6,120,863 A | 9/2000 | Neculescu et al. |
| 6,359,272 B1 | 3/2002 | Sadek et al. |
| 6,919,547 B2 | 7/2005 | Tsontzidis et al. |
| 6,942,120 B2 | 9/2005 | Trent et al. |
| 2005/0145623 A1 | 7/2005 | Pool et al. |
| 2007/0137501 A1 | 6/2007 | Manuel |
| 2007/0141335 A1 | 6/2007 | Perera et al. |
| 2007/0261567 A1 | 11/2007 | Morgan |
| 2008/0178747 A1 | 7/2008 | Baker et al. |
| 2010/0269711 A1 | 10/2010 | Klein et al. |
| 2011/0311701 A1 | 12/2011 | Lewis et al. |

FOREIGN PATENT DOCUMENTS

| | | |
|---|---|---|
| GB | 1 262 296 | 2/1972 |
| GB | 2 406 259 A | 3/2005 |
| GB | 2 406 489 A | 3/2005 |
| JP | 5-97142 | 4/1993 |
| JP | 2006-29622 | 2/2006 |

* cited by examiner

COOKING SUPPORT WITH REMOVABLE MESH INSERT

CROSS REFERENCE TO RELATED APPLICATION

This application claims the benefit of U.S. Provisional Patent Application Ser. No. 61/625,997, filed on 18 Apr. 2012. The Provisional Application is hereby incorporated by reference herein in its entirety and is made a part hereof, including but not limited to those portions which specifically appear hereinafter.

BACKGROUND OF THE INVENTION

1. Field of the Invention

This invention is directed to a food support, e.g., a solid or mesh basket, tray, or cooking sheet, for holding food items while heating or toasting in an oven.

2. Discussion of Related Art

Polymer coated cooking sheets and baskets are known for heating and toasting sandwiches in ovens. Such temperature resistant sheets or baskets are particularly useful for quickly toasting sandwiches in high speed or rapid cook ovens, such as are available from TurboChef Technologies, Inc. (Carrollton, Tex.) and/or MerryChef, Inc. (Fort Wayne, Ind.). High speed ovens typically incorporate several cooking elements, such as selected from hot air, infrared, radiant, conductive, and/or a microwave heating elements.

While being useful for toasting food items, known polymer coated cooking sheets and/or cooking baskets often lack the desired food support, durability, cleanability, heat dissipation (for proper cooking and/or operator safety), and/or appearance for commercial restaurants, particularly when food is prepared in view of customers. Also, these known sheets and baskets are typically removed from an oven with a pizza paddle or equivalent, which does not generally provide the fully desired stability for the removed sheet or basket. There is a continuing need for an improved cooking sheet or basket/tray for use in cooking various food items in high temperature/high speed ovens.

SUMMARY OF THE INVENTION

A general object of the invention is to provide an improved cooking basket, tray, or sheet, particularly for use in high speed, rapid cook, and/or conventional ovens.

The general object of the invention can be attained, at least in part, through a food support for holding food items during cooking in an oven. The food support of this invention includes a reinforcement structure, such as a support frame, secured to and/or about an edge of removable and replaceable substrate insert. The substrate can optionally be held within the support frame by a securing element during use, and can be removed for washing and/or replacement. The substrate insert can be solid or include multiple openings for heated air passage. In one embodiment the substrate is or includes a mesh substrate with a plurality of openings, such as having an opening length and/or width of about 0.10 inch (about 0.381 cm) to about 0.70 inch (about 1.778 cm). The food support components are formed of high temperature resistant materials, such as polymers. A coating including a heat resistant polymer coats at least the mesh substrate.

The invention further provides a food support for holding food items during cooking in an oven that includes a support frame for holding a mesh substrate at an outer edge. The mesh substrate includes a plurality of openings having a length and/or width of about 0.10 inch (about 0.381 cm) to about 0.7 inch (about 1.778 cm). The support frame and/or mesh substrate is formed of a material including fiberglass, nylon, polyester, aramid, polyethylene, polyolefin, ceramic, polysulfone, polyketone, polyphenylene sulfide, polyimide or combinations thereof. The support frame and/or mesh substrate can be thermo-formed or molded of or include a heat resistant polymer. The heat resistant polymer can include, for example, a fluoropolymer, a fluoroelastomer, a silicone rubber, a silicone resin, a urethane rubber, a urethane resin, a polyketone, a polyamide-imide, a polyphenylene sulfide, a liquid crystal polyester, a polyether sulfone or combinations thereof. The coated mesh substrate can have a thickness of greater than about 25 mils, more desirably about 25-60 mils, and more desirably greater than about 45 mils.

The food support of this invention, which can be formed, for example, as a cooking basket/tray or a planar cooking sheet, is useful for placing and removing food items from, and holding food items while in, an oven. The food support of this invention is desirably durable for multiple heating cycles, high temperature and water resistant, easy to clean, stain resistant, and dissipates heat quickly; all while desirably not having any or much effect on the cooking of food. The food support can include a solid bottom substrate sheet, such as to prevent liquids from dripping on heating elements, or a mesh substrate sheet. The thickness of the coated mesh substrate and/or the size of the mesh openings provide the ability to cook different food items and provide, for example, the desired food browning, toasting and/or heating characteristics.

BRIEF DESCRIPTION OF THE DRAWINGS

These and other objects and features of this invention will be better understood from the following detailed description taken in conjunction with the drawings.

DESCRIPTION OF PRESENTLY PREFERRED EMBODIMENTS

Figure 10:
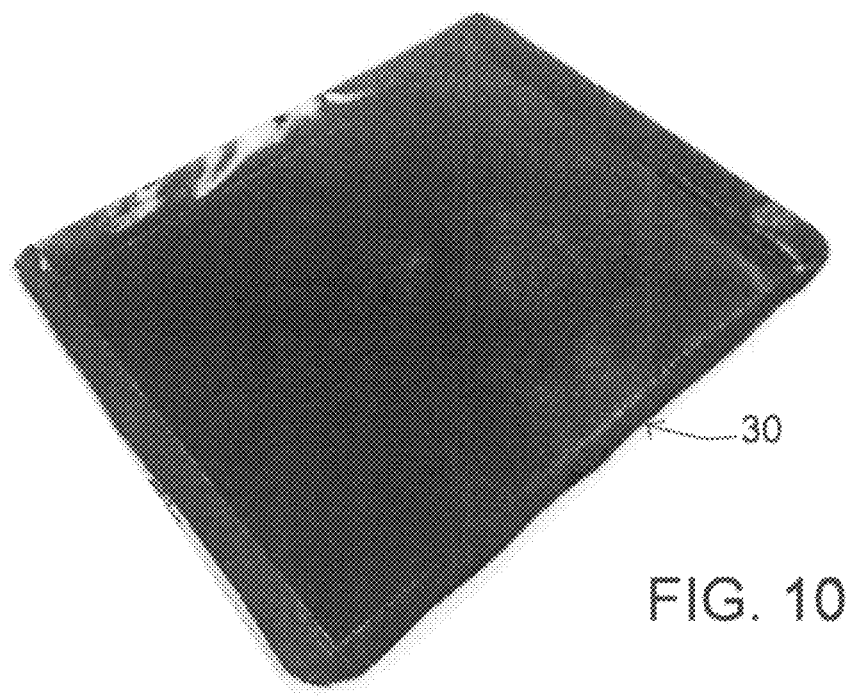
FIGS. 10 and 11 show a substrate insert and a food support according to embodiments of this invention.

FIGS. 1-5 illustrate a support frame 10 of a food support according to one embodiment of this invention. A substrate insert, such as the mesh substrate insert 30 shown in FIG. 6 or the solid substrate insert 30 shown in FIG. 10, is removably placed or attached within the frame 10 to collectively form the food support. The food support is particularly useful for holding and heating food items, such as, without limitation, sandwiches, chicken wings, or pizza in an oven. The food items may be placed directly on the food support, or, to further avoid food drippings, a sheet of a suitable cooking paper or film, e.g., siliconized sheet, can be placed between the food items and the food support.

As shown in FIGS. 1-5, the support frame 10 includes a perimeter frame 12, formed in a square shape. The perimeter frame 12 has a lower perimeter bar 14 connected to an upper perimeter bar 16 by vertical slats 18. Crossbars 20, for receiving the substrate insert, extend from the lower perimeter bar 14 across the open interior, and optional further crossbars 20' fill in additional open areas. In the embodiment of FIGS. 1-5, the perimeter frame 12, and the support frame 10, is formed as one integral piece, such as by thermoforming, injection molding, stamping, or cutting. Alternatively, the perimeter frame 12 can be assembled from one or more separate upper bar(s), lower bar(s), crossbar(s), and/or vertical slats.

Figure 15:
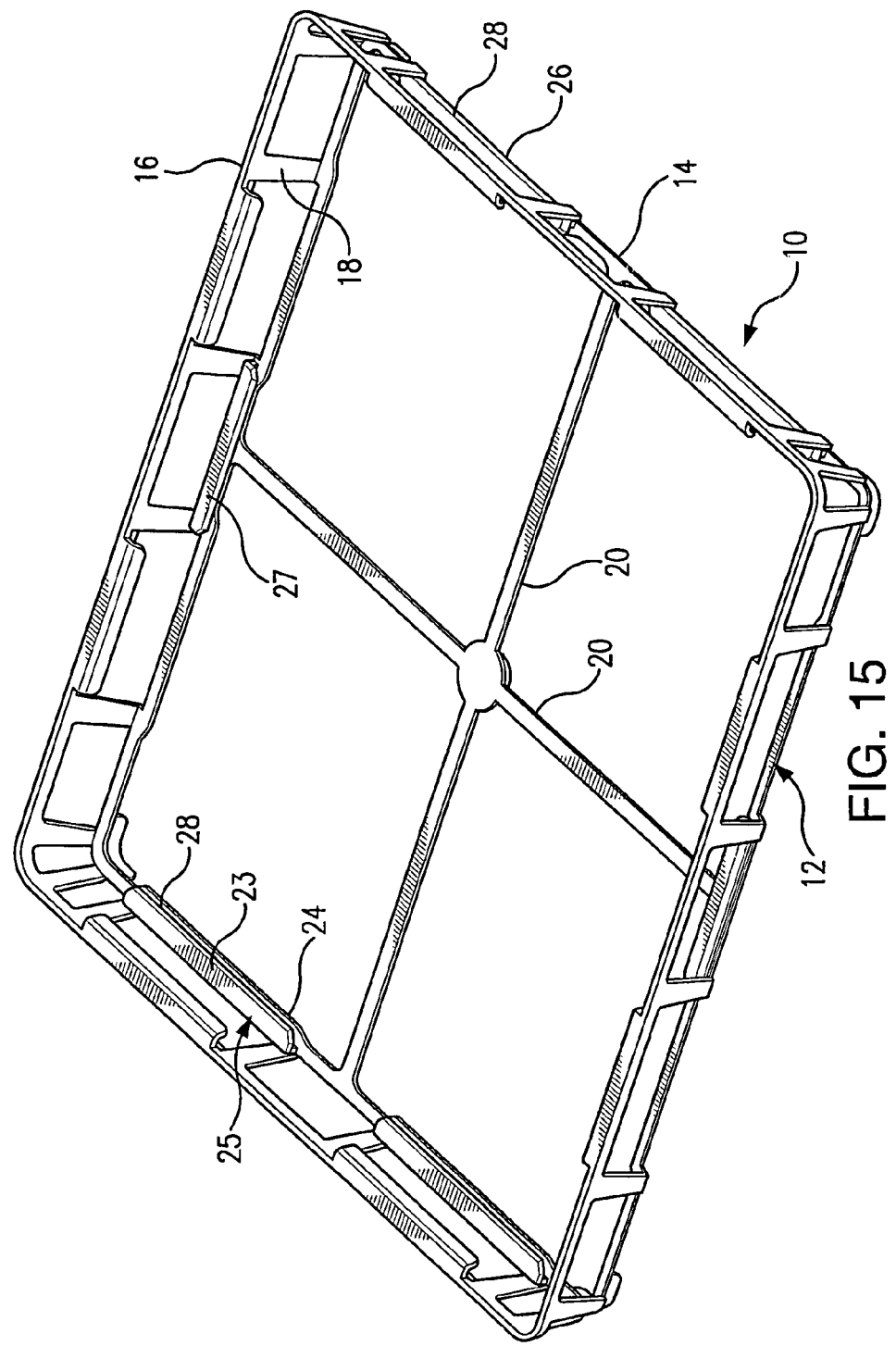
FIGS. 15-20 include views of support frames and components therefor for food supports according to additional embodiments of this invention.
Figure 16:
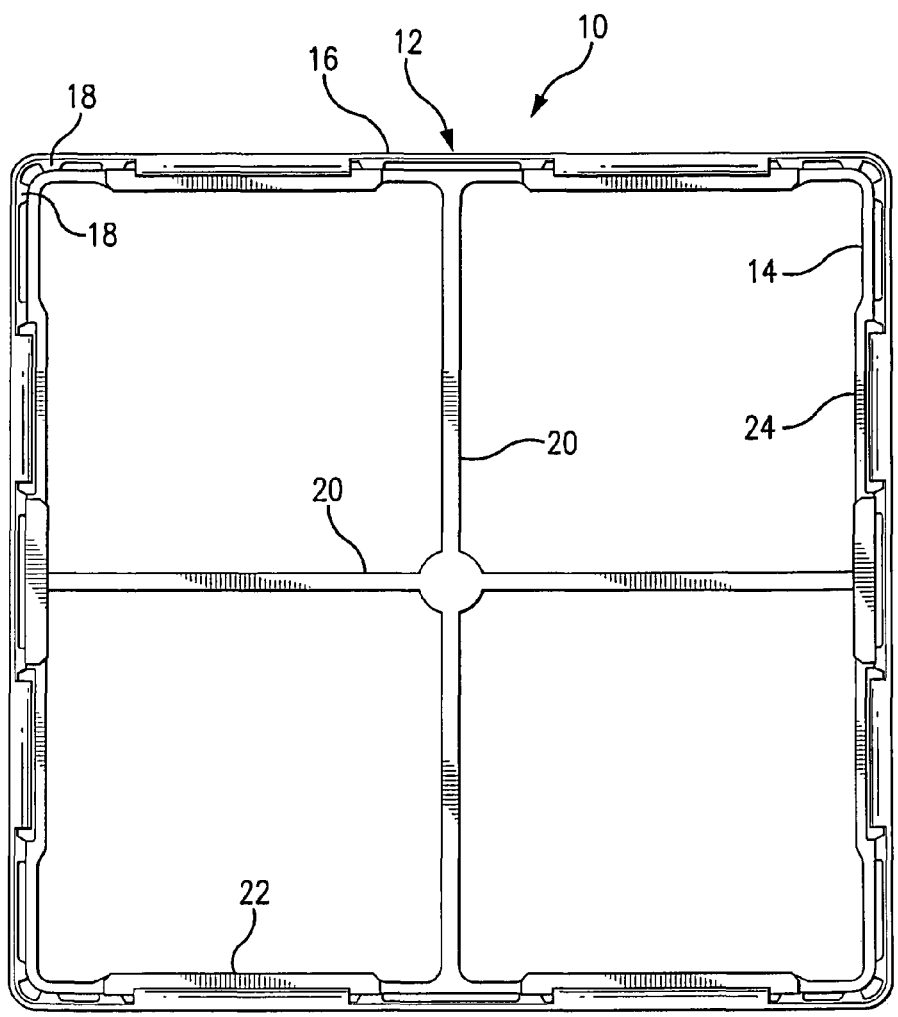
Figure 17:
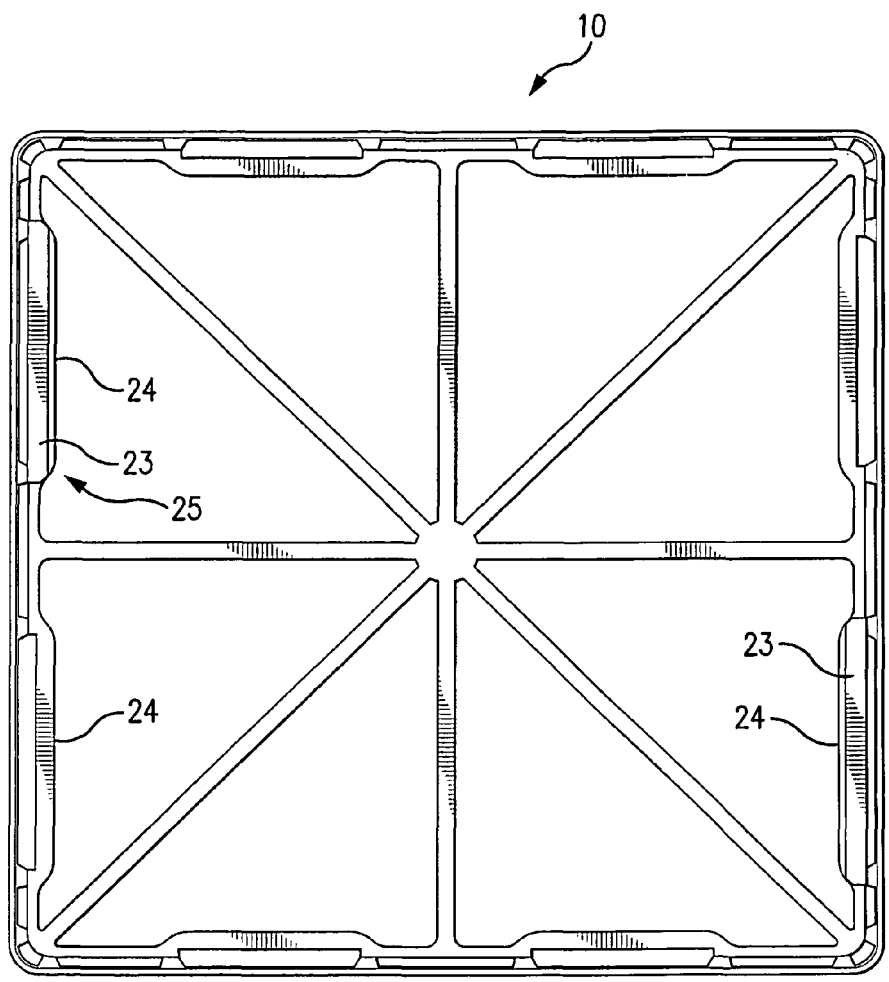

Various and alternative sizes, shapes, materials, and configurations are available for the support frame, the upper bar, the lower bar, the crossbars, and/or vertical slats of this invention. For example, the support frame can be round, rectangular, or any suitable shape. Support frame length, width and/or height can vary depending on need. In one embodiment of this invention, the length and/or width is about 4 inches to 20 inches, more desirably about 12 inches to 15 inches, and preferably between about 13 inches to about 14 inches. For example, the food support or substrate can be 4, 6, 12, 13, 14, 15, or 16 inches square, or rectangular, such as 6 inches by 12 inches. The spacing formed within the lower bar 14 can be smaller than the spacing formed within the upper bar 16 to promote substrate insertion. Desirably the perimeter of the lower bar 14 is matched to the outer edge of the substrate to be inserted. Also, the open spaces between the upper and lower bars and vertical slats can promote cooking, but can be replaced with a solid wall. Alternative crossbar patterns are shown in FIGS. 15-17.

Figure 1:
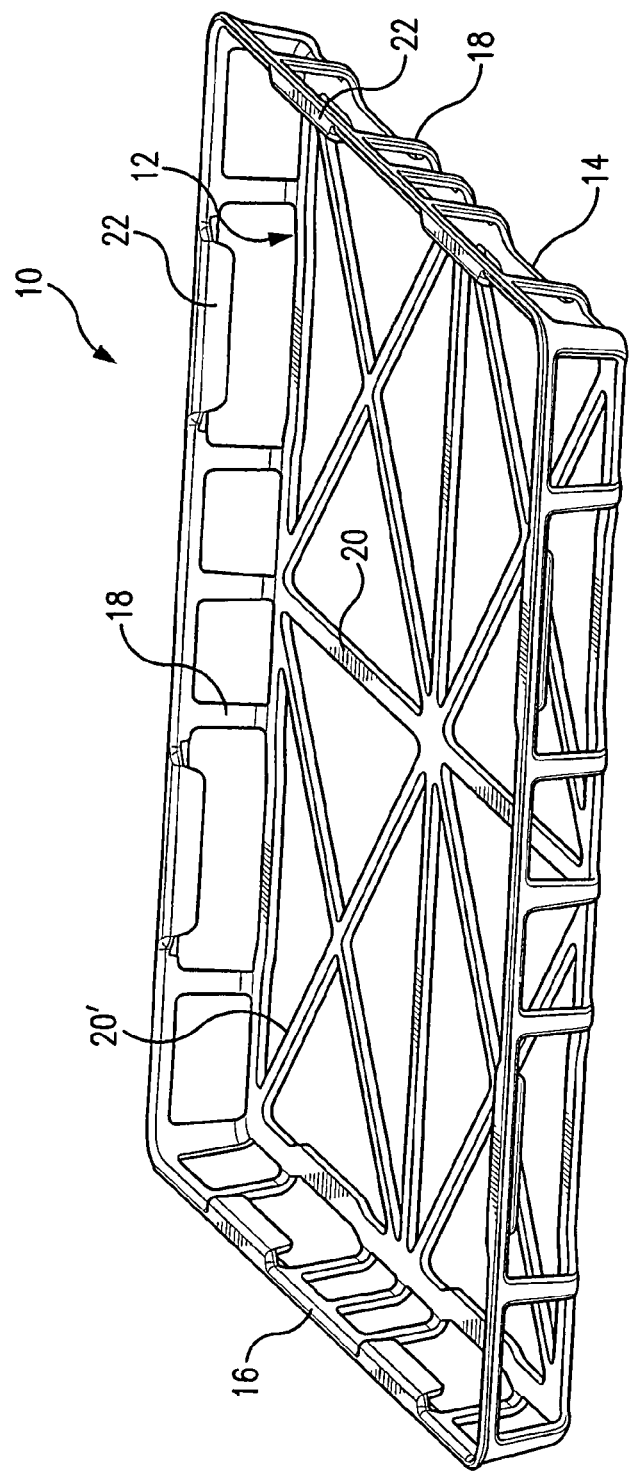
FIGS. 1-5 illustrate a support frame for a food support according to one embodiment of this invention.
Figure 2:
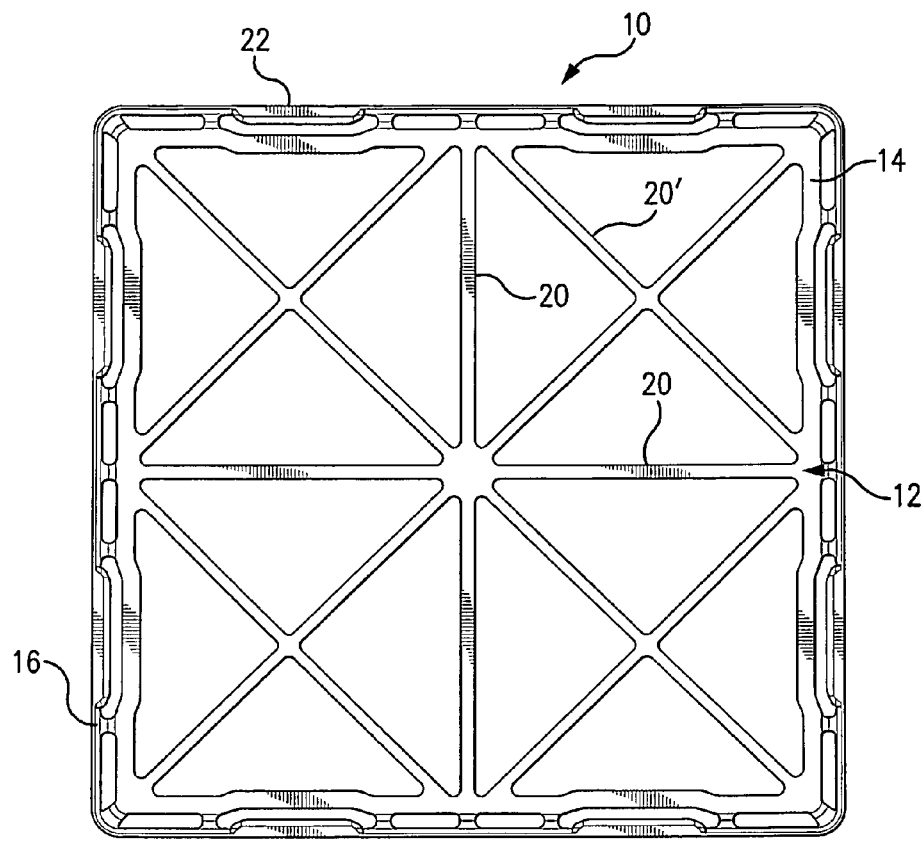
Figure 3:
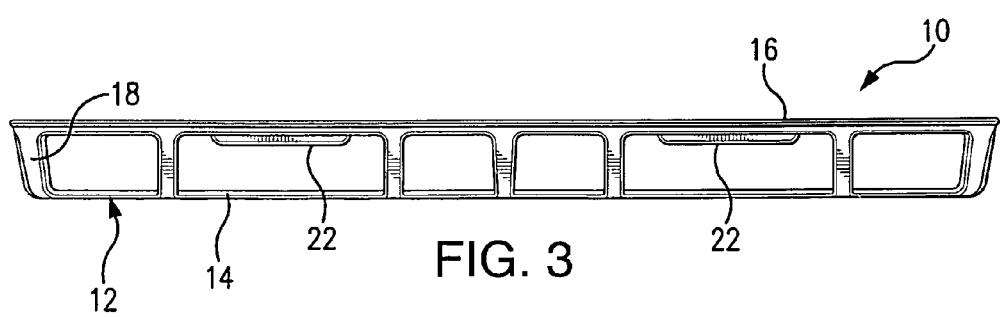
Figure 4:
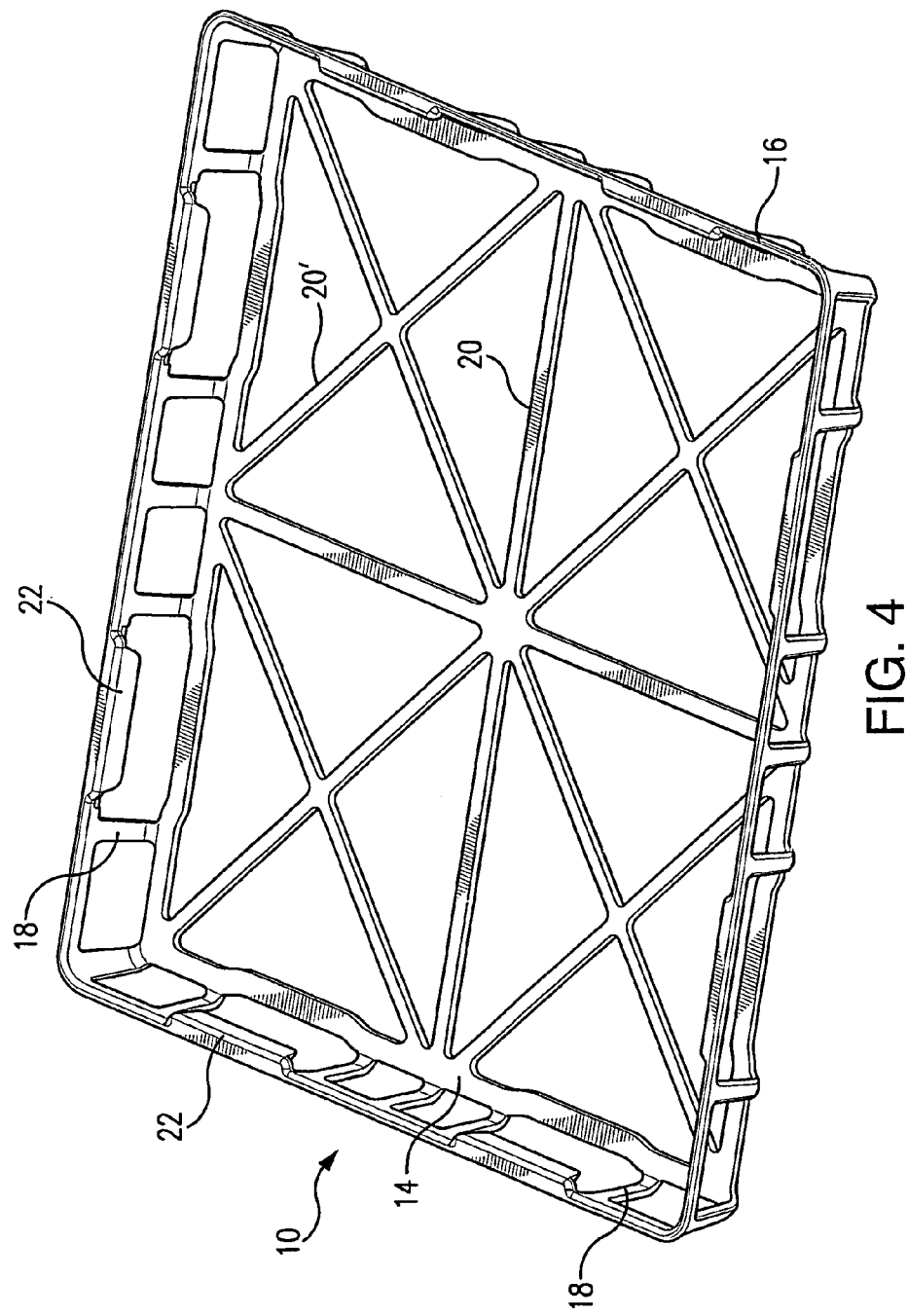
Figure 5:
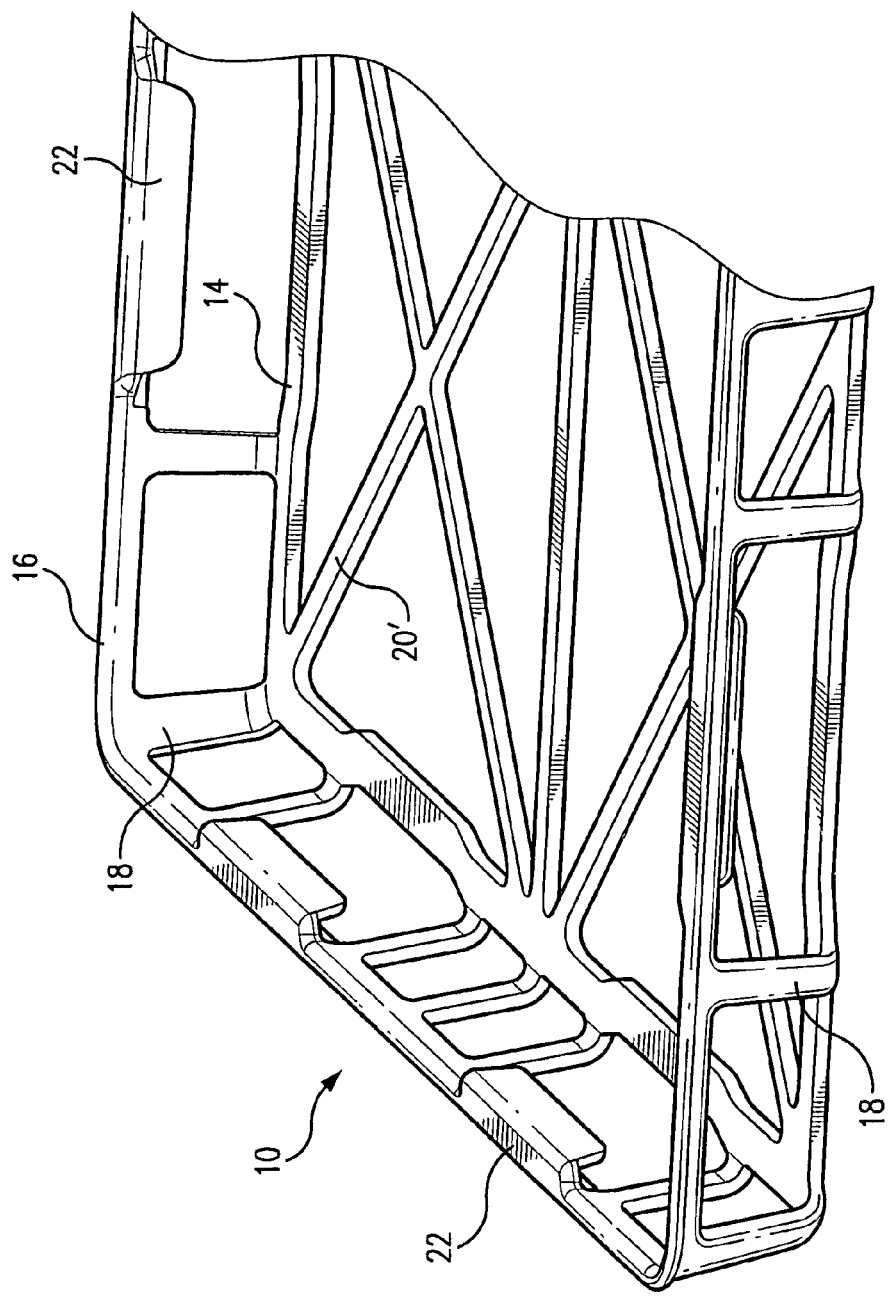
Figure 6:
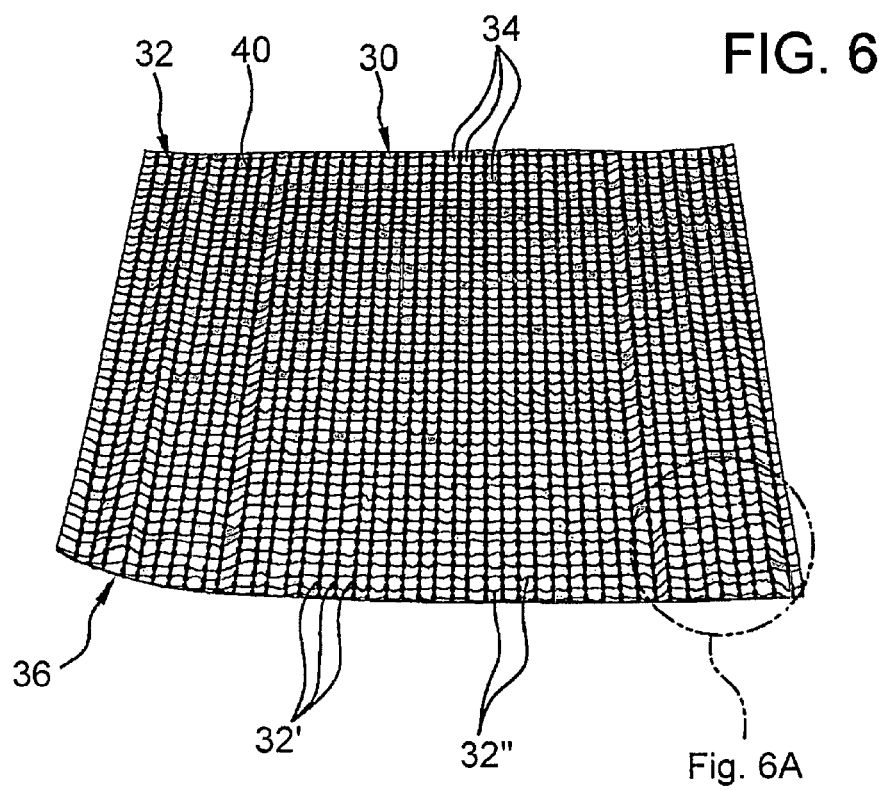
FIGS. 6 and 7 illustrate embodiments of a substrate insert for the support frame of FIG. 1, according to embodiment of this inventions.
Figure 6A:
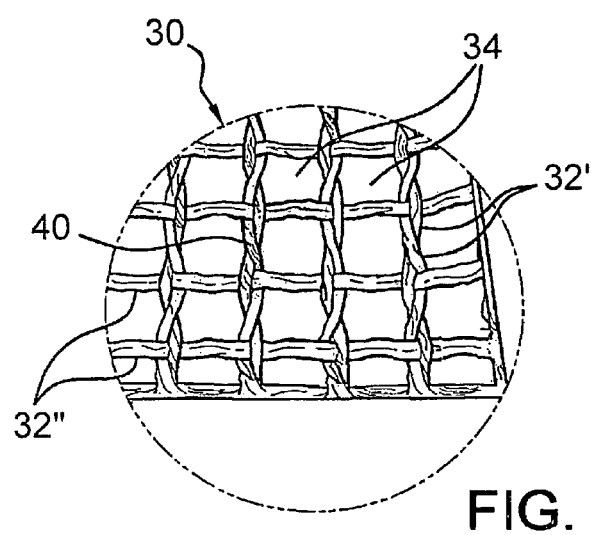
FIG. 6A is an enlarged view taken from FIG. 6.
Figure 8:
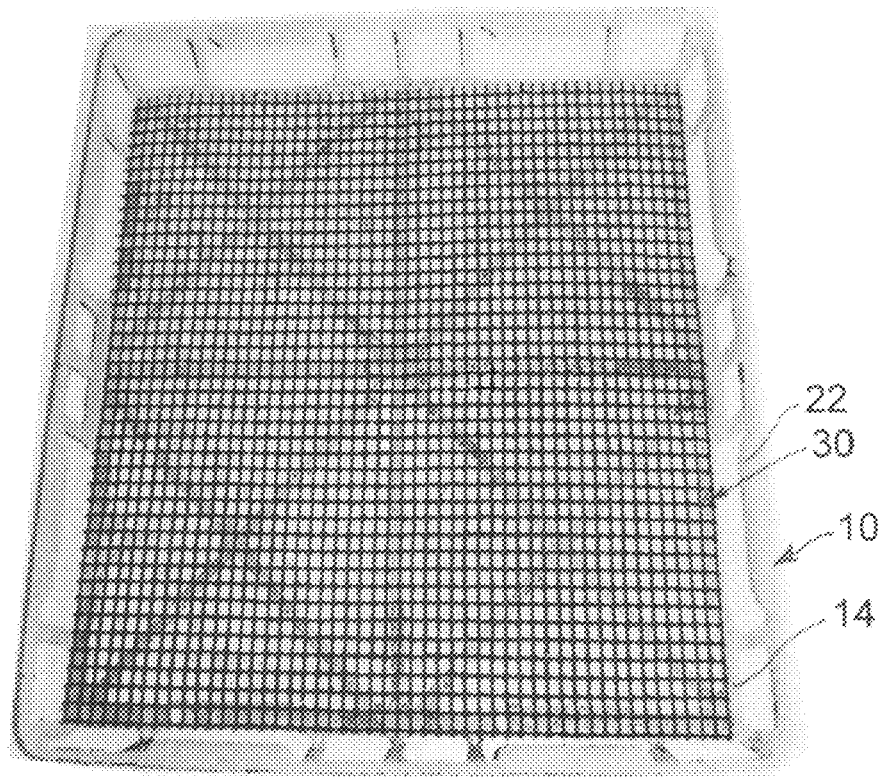
FIGS. 8 and 9 show food supports according to embodiments of this invention.
Figure 9:
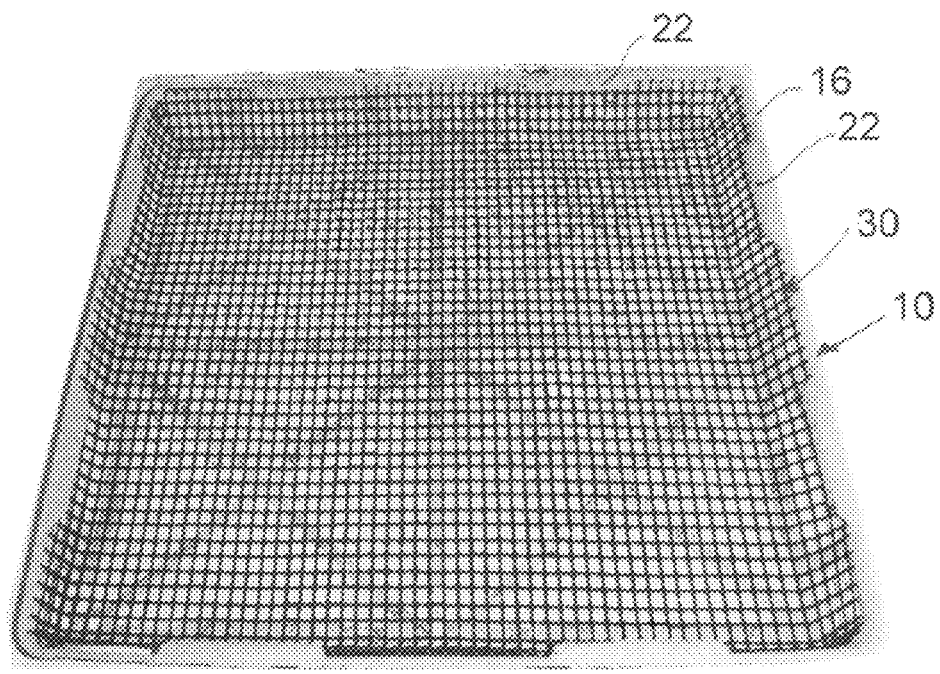
Figure 11:
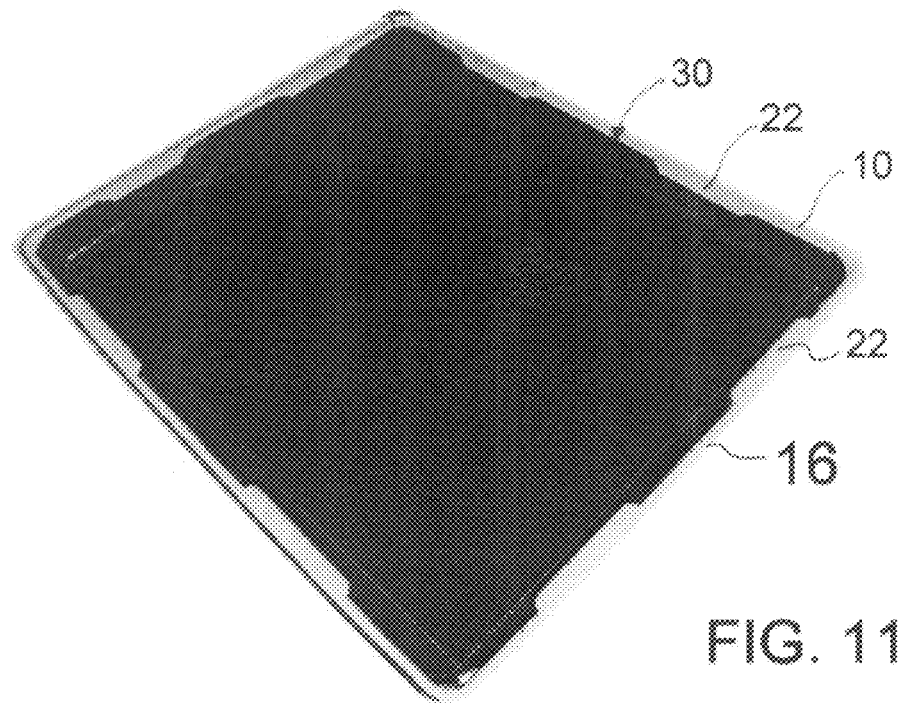

The support frame 10 includes an optional securing element or mechanism for securing the separate substrate within the support frame. The substrate can be desirably sized and shaped to fit within a substrate placement area of the support frame 12, resting on the crossbars 20, as shown in FIGS. 8, 9, and/or 11. The sheet-type substrate insert 30 of FIG. 6 is sized to cover the bottom of the substrate placement area, as shown in FIG. 8. In the alternative embodiments of the basket-type substrate insert 30 shown in FIGS. 7 and 10, the substrate insert 30 extends up the sides of the support frame 10. The securing element can include any suitable clip, hook, slot, snap, pin, or similar element. In one embodiment of this invention, as shown in FIGS. 1-5, 8, 9, and 11, the securing element includes a plurality of clip, slot, or hook rails 22 disposed spaced apart along the upper bar. As shown in FIGS. 9 and 11, the edges of the basket-type substrate insert 30 fit under the downward facing securing element rails 22.

Various and alternative sizes, shapes, materials, and configurations are available for the rails or other securing element of this invention. The rails can include a spring or other compression element to provide a clamping force on the substrate edge. The rails can be formed as clips for attaching the substrate to the support frame 10. The clips can alternatively be separate C-shaped elements that clamp around the lower bar 14 or upper bar 16 and the substrate 30. Alternative securing structures, such as snaps, magnets, or locking pins can also be used.

Figure 7:
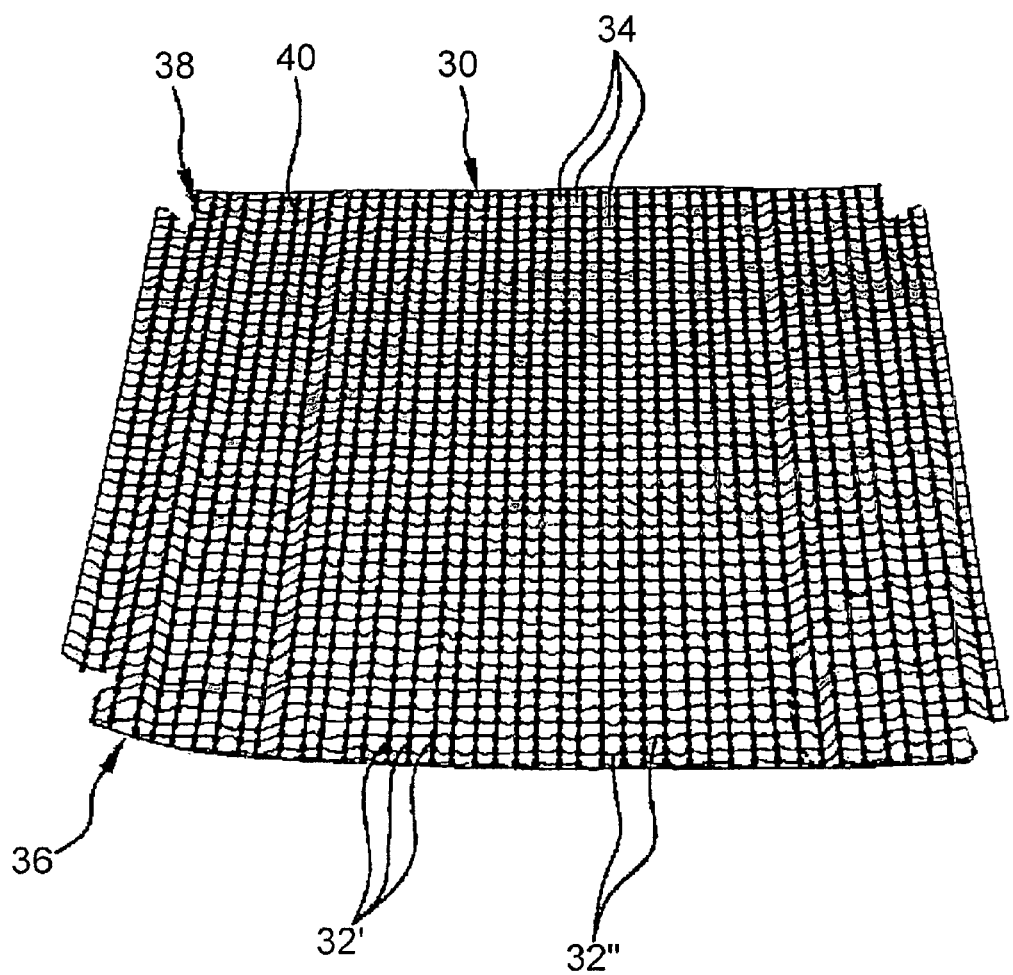

The support frame 10 receives and secures a substrate insert, such as insert 30 in FIG. 6, 7, or 10, which sits on the crossbars 20 and/or 20' to form a food support. The substrate is semi-rigid or flexible, such as thermoformed fluoropolymer sheets or film inserts of PPS or PPS and fiberglass, and the support frame provides the desired rigidity for holding food while being placed in and out of an oven. The support frame can be used to provide a more pleasing appearance, allows for easy cleaning and replacement of used substrates, as needed, and/or provides rapid heat dissipation, which can be beneficial for proper cooking and improves operator safety. Rapid heat dissipation is particularly desirable in embodiments of this invention, so as to not add to the cooking time over conventional cooking sheets or baskets.

Material blends such as PPS/PAI/PTFE, PPS/PAI/PFA/PTFE, LCP/PTFE, LCP/PTFE/PFA, or LCP alone, can provide non-stick, stain resistant, and/or other easy cleaning or heat dissipative properties. The support frame and substrate are desirably formed from a high temperature resistant material that is also resistant to steam and water, thereby providing durability for multiple heating and cleaning cycles. The support frame is desirably formed of one or more polymers having a low thermal conductivity and/or microwave transparency, thereby maximizing the cooking energy applied to the food. Additives can be included to promote desirable properties. Exemplary additives include materials that reduce the thermal mass and enable rapid cooling, such as hollow glass spheres, chopped fiberglass, mica, etc.

The substrate for placement within the support frame 10 can be solid as shown in FIG. 10, or open as shown in FIGS. 6 and 7. FIG. 6 illustrates an exemplary open mesh substrate 30. The mesh substrate of this invention can be formed, for example, from woven or otherwise interconnecting yarns, threads and/or wires, or can be an apertured film. Various materials are available for forming the mesh substrate 30 including, without limitation, fiberglass, nylon, polyester, aramid, liquid crystal polymer (such as liquid crystal polyester), polyethylene, polyolefin, ceramic, polysulfone, polyketone, polyphenylene sulfide, polyimide, or combinations thereof. In one particularly preferred embodiment, as shown in FIG. 6, the mesh substrate 30 is formed of fiberglass threads. Each strand 32 of the mesh substrate 30 of FIG. 6 is formed of two fiberglass threads, with the two threads of the strands 32' extending in a first direction twisted or braided around the two threads of each of the strands 32" extending in the perpendicular direction. As will be appreciated by those skilled in the art following the teachings herein provided, various and alternative mesh materials are available for use in the food support of this invention. Mesh substrate insert 30 of this invention can also be injection molded or thermoformed, for example, and then die cut or otherwise structurally separated. The mesh can be slit or notched at the corners, as shown in FIG. 7, to facilitate extending the mesh over the vertical sides of the frame, as shown in FIG. 9.

The mesh substrate 30 includes a plurality of openings 34 having a length and/or width of about 0.10 inch (about 0.381 cm) to about 0.65 inch (about 1.27 cm), desirably about 0.2 inch (about 0.508 cm) to about 0.3 inch (about 0.762 cm), and more desirably about 0.22 inch (about 0.559 cm) to about 0.28 inch (about 0.711 cm). The openings 34 have a generally square shape, although alternative shapes, such as rectangular, circular or irregular shapes, can also be used. As will be appreciated, forming the mesh of yarns or threads can result in, for example, less than perfectly square-shaped openings. Therefore, in one embodiment of this invention, the lengths and widths across the plurality of openings 34 vary by a small margin, but at at least some point include the measurements described above.

The mesh substrate 30 includes a coating 40 thereon. The coating 40 desirably includes a heat resistant polymer. As used herein, "heat resistant" refers to the ability of a material to withstand temperatures of about 400° F. (about 204.4° C.) or greater. Exemplary heat resistant polymers available for use in the frame or coatings of this invention include, without limitation, fluoropolymers, fluoroelastomers, silicone rubbers, silicone resins, urethane rubbers, urethane resins, polyketones, polyamide-imides, polyphenylene sulfides, liquid crystal polyesters, polyether sulfones and combinations thereof. In the embodiment shown in FIG. 6, the fiberglass mesh substrate 30 is desirably coated with polytetrafluoroethylene (PTFE). Coating can be accomplished by various and alternative coating techniques known and available to those skilled in the art, such as, without limitation, spray or dip coating techniques.

The thickness and number of layers of the coating 40 can be adjusted according to need. In one embodiment of this invention, the coated mesh substrate 30 (i.e., the combined mesh substrate 30 and the coating 40) has a thickness of greater than about 25 mils, desirably greater than about 45 mils, more desirably greater than about 55 mils, and preferably at least about 60 mils.

The mesh substrate 30 can optionally include an edge reinforcement member over or attached to the mesh substrate 30 at a mesh substrate outer edge 36. Such an edge reinforcement member extending around the mesh substrate 30 can provide additional support, such as for attachment under the rails 22. In one embodiment of this invention, the edge reinforcement member can be formed of one or more films applied to one or more sides of the mesh substrate 30 at the outer edge 36, and desirably covers or fills the openings 34 that the film is disposed over. In one embodiment, the film edge reinforcement member can be folded over the outer edge 36 to cover a portion of both sides of the mesh substrate 30. Desirably, the film is formed of a heat resistant polymer, such as described above. In one embodiment, the edge reinforcement member is or includes a fluoropolymer film. Exemplary fluoropolymers for forming the fluoropolymer film include perfluoroalkoxy, fluorinated ethylene-propylene, polytetrafluoroethylene, tetrafluoroethylene or combinations thereof. FIG. 10 illustrates a solid basket substrate insert 30 that can be formed, for example, by applying a fluoropolymer film to a support substrate, or other similar means.

Figure 12:
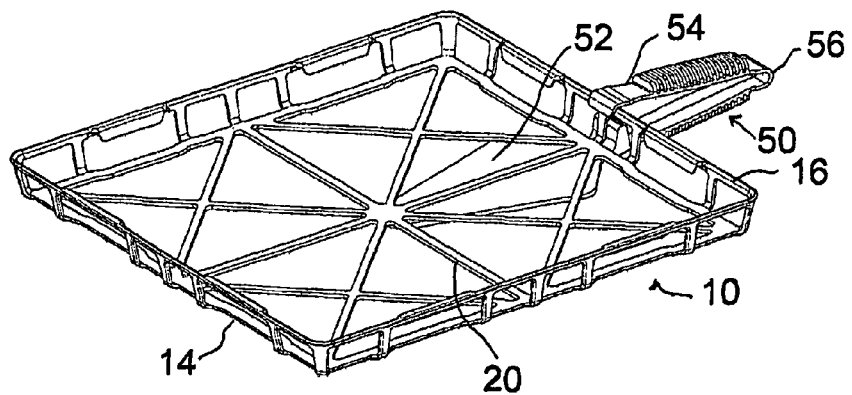
FIGS. 12-14 illustrate a support frame and holding device for a food support according to one embodiment of this invention.
Figure 13:
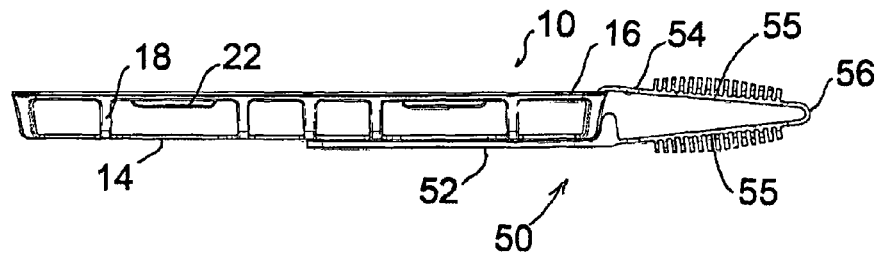
Figure 14:
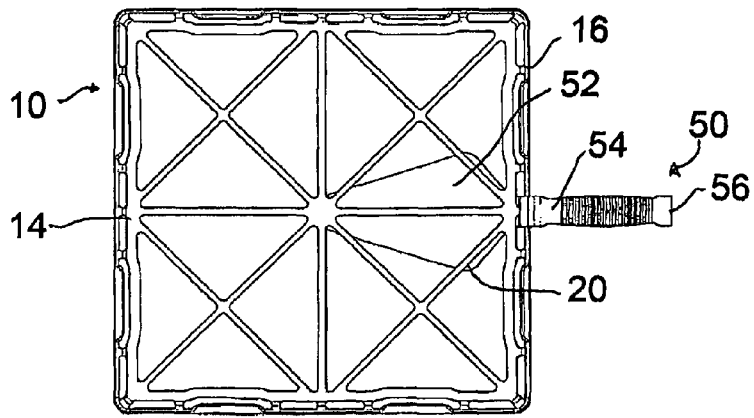

In one embodiment of this invention, a holding device is used with the food support, such as for placing the food support in and/or removing the food support from an oven. FIGS. 12-14 illustrate a holding device 50, and show the holding device used in combination with a support frame 10. The holding device 50 includes a first portion that secures to or otherwise holds or supports a bottom side of the support frame 10, and a second portion that secures to or holds a top side of the support frame. As will be appreciated, the structure and holding function of the holding device of this invention can vary depending on the structure and configuration of the support frame.

In the particular embodiment of FIGS. 12-14, the holding device 50 includes a holding surface 52, similar to a spatula or paddle structure, for sliding under and supporting the support frame 10. A clamping element 54, formed of a clamp at the end of one of two pinchable arms 55, similar to a tong structure and each including a grip portion, is connected to the holding surface 52 via flexible joint 56 between the two flexible arms 55. The clamping element 54 clamps over an upper facing or top surface of the food support, such as the upper bar 16 in FIGS. 12-14. By placing the holding surface 54 under the food support and clamping the clamping element 54 over a top of the food support, the food support can be introduced and/or removed from an oven with increased stability.

In the embodiment shown in FIG. 8, the sheet-type substrate insert 30 of FIG. 6, or an equivalent sheet-type solid substrate insert, simply lays on the substrate placement area without a securing element, and can be held in place by the vertical slats 18. In other embodiments, such as shown in FIGS. 15-19, the securing element includes a plurality of rails 25 disposed spaced apart along the lower bar 14. As shown in FIG. 15, on two sides the rails 25 include a lower rail 24 formed from the lower bar 14. The edges of the sheet-type substrate insert 30, such as shown in FIG. 6, are held between each lower rail 24 and the corresponding upper rail 23 of each rail 25. The lower rail 24 can be formed as a widened and/or or an inwardly extending portion of the lower bar 14. In one embodiment of this invention, as shown in FIG. 17, the lower rail 24 optionally extends inward further than the upper rail 23, which can reduce substrate slippage and promote ease of installation. Returning to FIGS. 15 and 16, on the other two opposing sides of the support frame, two optional side rails 27 are centered and extend over opposing ends of one of the corresponding crossbars 20.

Figure 18:
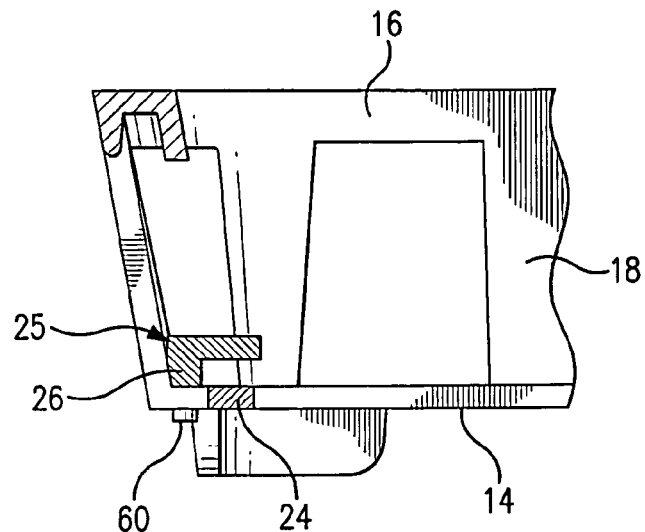
Figure 19:
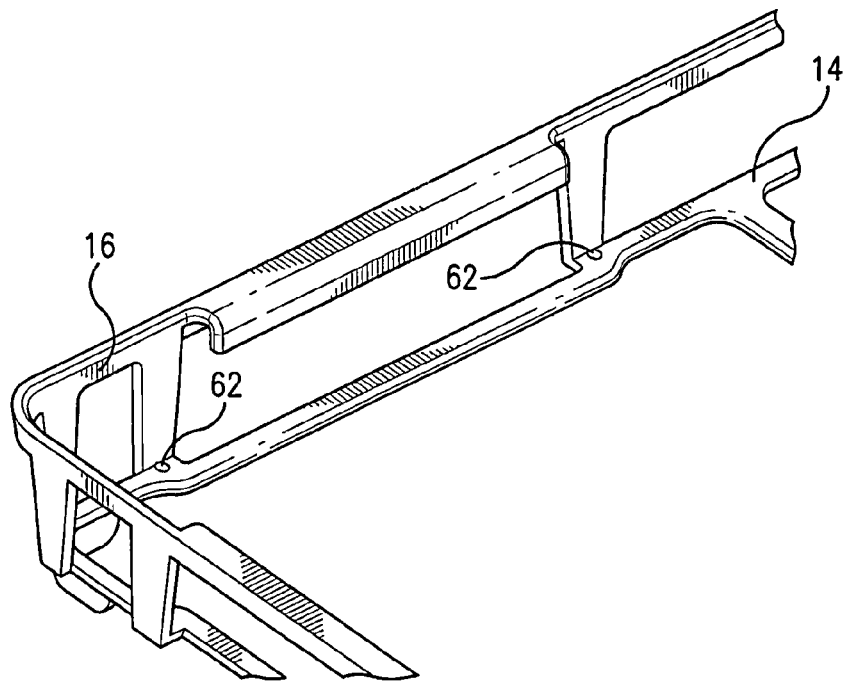

The upper rails 23 can be attached to the lower bar 14 by any suitable mechanism, such as screws, bolts or rail posts 60 that fit or snap into counterpart holes 62 in the lower bar 14, as shown in FIGS. 18 and 19. The upper rails 23 include a vertical section 26 and a horizontal section 28 that extends over the lower rail 24 and an edge of an inserted substrate. The horizontal section 28 desirably extends at an angle of 90° or less from the vertical section 26, and can include any suitable lip or other suitable substrate holding means.

Figure 20:
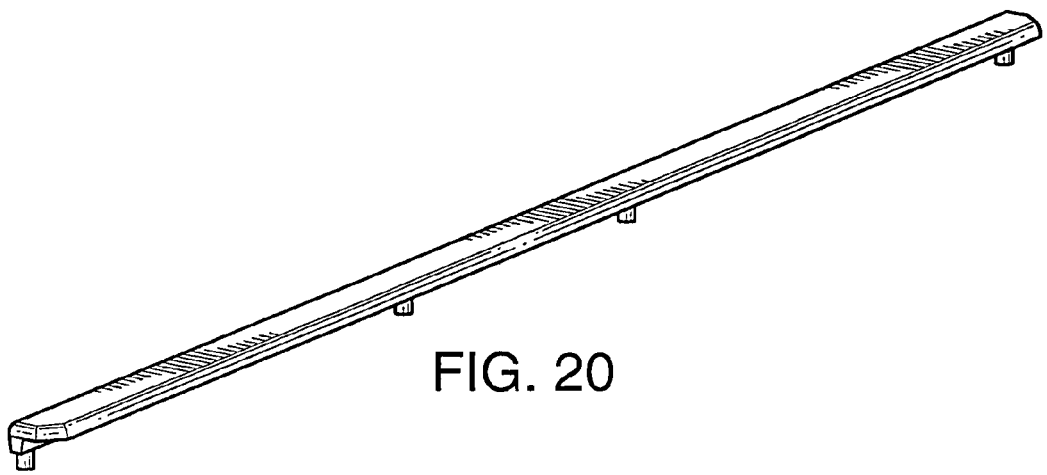

Various and alternative sizes, shapes, materials, and configurations are available for the rails of the lower bar 14. For example, larger single upper rails, such as shown in FIG. 20, can be used on opposing or all sides. The rails can include a spring or other compression element to provide a clamping force on the substrate edge. The rails can be formed as clips for attaching the substrate to the support frame 10. The clips can be separate C-shaped elements that clamp around the lower bar 14 and the substrate. Alternative securing structures, such as snaps, magnets, or locking pins can also be used.

Thus, the invention provides a food support, particularly a cooking basket, tray, or sheet, useful for placing and removing food items from, and holding food items while in, an oven. The food support of this invention is high temperature resistant, and can be used in ovens having retention heat temperatures as high as 600° F. (about 316° C.). The thickness of the coated mesh substrate and the size of the openings provide the ability to cook different food items and provide desirably browning and heating characteristics. The support frame allows for use of the flexible mesh substrate in a rigid, durable, and visually pleasing manner.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A food support for holding food items during cooking in an oven, comprising a reinforcement structure separate from and adapted to be removably secured about an edge of a removable and replaceable substrate insert, the reinforcement structure formed of a heat resistant polymer and comprising a perimeter frame that extends about a substrate placement area of the substrate insert, and at least one frame element extending between two portions of the perimeter frame and beneath the substrate placement area.

2. The food support according to claim 1, wherein the reinforcement structure is formed as a molded, stamped, or thermoformed integral piece.

3. The food support according to claim 1, wherein the reinforcement structure comprises at least one cross bar extending between two opposing sides of the perimeter frame and beneath the substrate placement area.

4. The food support according to claim 3, wherein the perimeter frame comprises a lower perimeter bar connected to an upper perimeter bar by vertical slats.

5. The food support according to claim 1, further comprising a solid substrate insert or a mesh substrate insert that includes a plurality of mesh openings for heated air passage.

6. The food support according to claim 5, wherein the mesh openings have an opening length and/or width of about 0.10 inch to about 0.70 inch.

7. The food support according to claim 5, wherein the support frame and/or the substrate insert comprises fiberglass, nylon, polyester, aramid, polyethylene, polyolefin, ceramic, liquid crystal polymer, polysulfone, polyketone, polyphenylene sulfide, polyimide, or combinations thereof.

8. The food support according to claim 5, wherein the substrate insert comprises the heat resistant polymer.

9. The food support according to claim 1, wherein the heat resistant polymer comprises a fluoropolymer, a fluoroelastomer, a silicone rubber, a silicone resin, a urethane rubber, a urethane resin, a polyketone, a polyamide-imide, a polyphenylene sulfide, a liquid crystal polymer, liquid crystal polyester, a polyether sulfone, or combinations thereof.

10. The food support according to claim 1, further comprising a securing element, wherein the substrate insert is removably secured within the support frame by the securing element during use.

11. The food support according to claim 10, wherein the securing element comprises a clip, slot, or hook.

12. A food support for holding food items during cooking in an oven, comprising a reinforcement structure adapted to be secured about an edge of a removable and replaceable substrate insert, and further comprising a securing element, wherein the substrate insert is removably secured within the reinforcement structure by the securing element during use, and wherein the securing element comprises a plurality of rails disposed spaced apart along a perimeter frame of the reinforcement structure, wherein substrate edges are each held between the perimeter frame and a corresponding rail.

13. A food support for holding food items during cooking in an oven, comprising a reinforcement structure adapted to be secured about an edge of a removable and replaceable substrate insert, and further comprising a securing element, wherein the substrate insert is removably secured within the reinforcement structure by the securing element during use, and wherein the reinforcement structure comprises a perimeter frame including a lower perimeter bar connected to an upper perimeter bar, and at least one of the lower perimeter bar and the upper perimeter bar comprises the securing element.

14. The food support according to claim 13, wherein the securing element comprises a clip, slot, or hook extending from the at least one of the lower perimeter bar and the upper perimeter bar.

15. A food support for holding food items during cooking in an oven, comprising a reinforcement structure adapted to be secured about an edge of a removable and replaceable substrate insert, and further comprising a holding device comprising a holding surface connected to a clamping element, wherein the holding surface is adapted to support a bottom of the food support and the clamping element is adapted to clamp over a top surface of the food support.

16. The food support according to claim 13, wherein the securing element comprises a clip or hook extending from the at least one of the lower perimeter bar and the upper perimeter bar.

17. The food support according to claim 13, further comprising a solid substrate insert or a mesh substrate insert that includes a plurality of mesh openings for heated air passage.

18. The food support according to claim 13, wherein the reinforcement structure and/or the substrate insert comprises of a material including fiberglass, nylon, polyester, aramid, polyethylene, polyolefin, ceramic, polysulfone, polyketone, polyphenylene sulfide, polyimide, a fluoropolymer, a fluoroelastomer, a silicone rubber, a silicone resin, a urethane rubber, a urethane resin, a polyketone, a polyamide-imide, a polyphenylene sulfide, a liquid crystal polyester, a polyether sulfone or combinations thereof.

19. The food support according to claim 13 further comprising and at least one cross bar extending between two portions of the lower perimeter bar and beneath the substrate insert.

20. The food support according to claim 13, wherein the reinforcement structure comprises a heat resistant polymer selected from a fluoropolymer, a fluoroelastomer, a silicone rubber, a silicone resin, a urethane rubber, a urethane resin, a polyketone, a polyamide-imide, a polyphenylene sulfide, a liquid crystal polymer, liquid crystal polyester, a polyether sulfone, or combinations thereof.

* * * * *